METHOD OF CREATING DESIGN MATERIAL FOR MAKING GARMENTS AND TRIM

Original Filed Aug. 23, 1967 3 Sheets-Sheet 1

INVENTOR.
JOHN BONANNO
BY Edward Halle
ATTORNEY.

METHOD OF CREATING DESIGN MATERIAL FOR MAKING GARMENTS AND TRIM
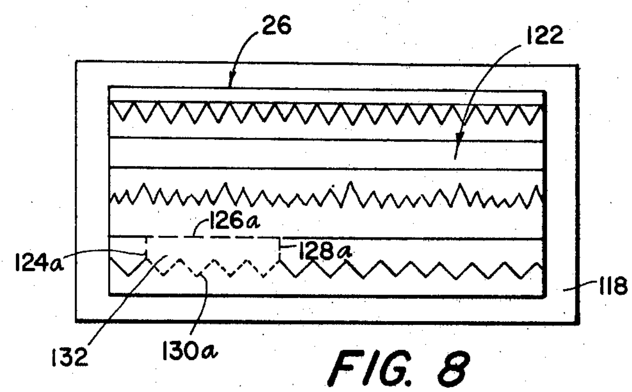
FIG. 8
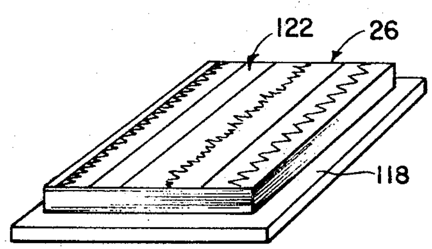
FIG. 9
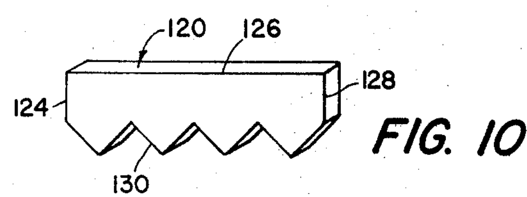
FIG. 10
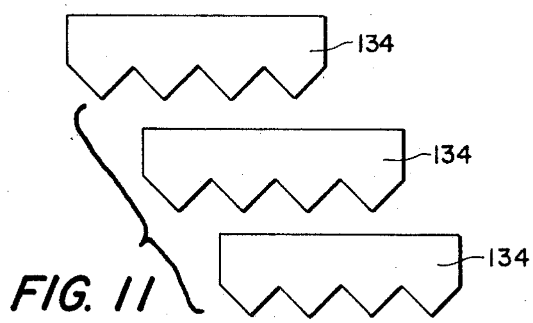
FIG. 11
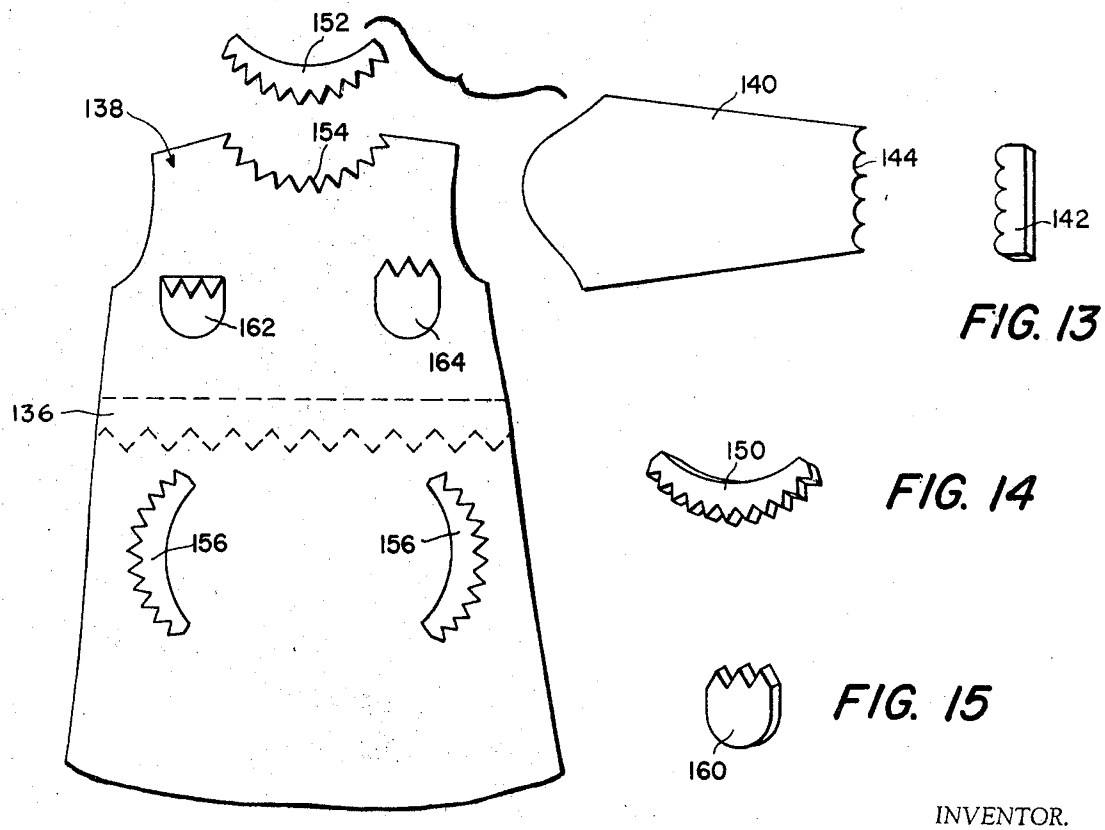
FIG. 12
FIG. 13
FIG. 14
FIG. 15
INVENTOR.
JOHN BONANNO
BY Edward Halle
ATTORNEY

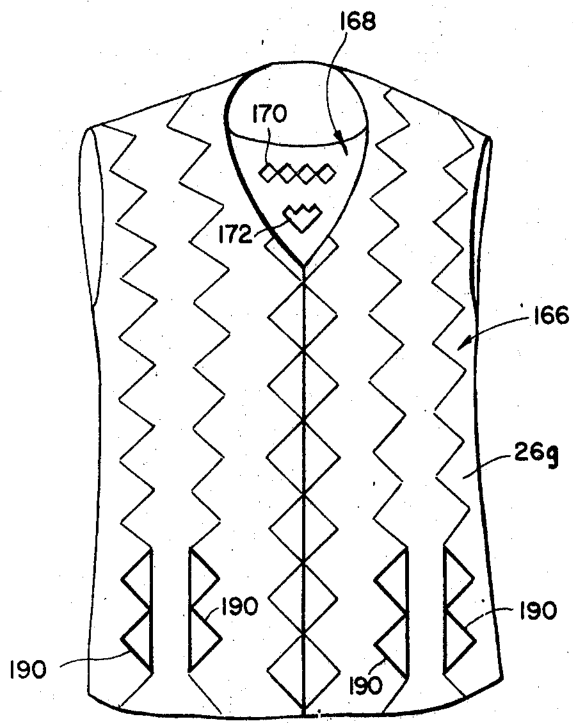
FIG. 16
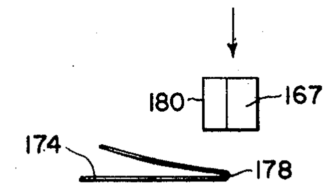
FIG. 17
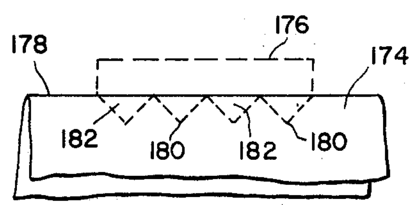
FIG. 18
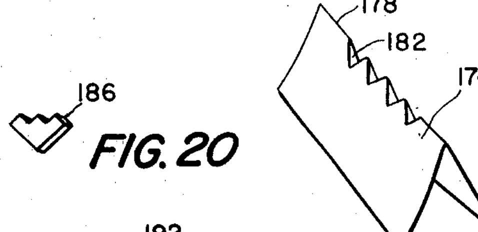
FIG. 20
FIG. 19
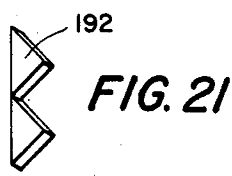
FIG. 21
FIG. 22
FIG. 23
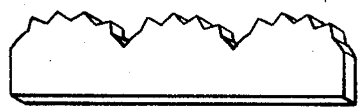
FIG. 25
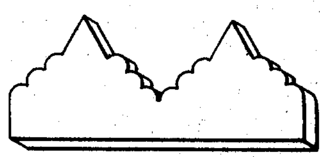
FIG. 24
INVENTOR.
JOHN BONANNO
BY Edward Walle
ATTORNEY.

United States Patent Office 3,525,104

Patented Aug. 25, 1970

3,525,104

METHOD OF CREATING DESIGN MATERIAL FOR MAKING GARMENTS AND TRIM

John Bonanno, 136—34 57th Road, Flushing, N.Y. 11355

Continuation of application Ser. No. 662,801, Aug. 23, 1967. This application Aug. 6, 1969, Ser. No. 849,291
Int. Cl. A41d *27/08*
U.S. Cl. 2—244 14 Claims

ABSTRACT OF THE DISCLOSURE

In this invention, material for making garments and trim is prepared with a pre-conceived design such as rows of stripes together with rows of scallops. This design material may then be used for cutting parts from a pattern to make a garment in the usual manner. The stripes and scallops may also be die cut by hand or machine to provide trim pieces, and also may be die cut in a plain material to provide design in a material itself. The original design material may have its stripes and/or scallops in varying widths so that an infinite number of die cut designs can be made from the design material to produce an infinite number of garment designs and trim pieces therefor, including pockets, collars, vestees, neck openings, and infinitum.

This application is a continuation of Ser. No. 662,801, filed Aug. 23, 1967, now abandoned.

This invention relates to the preparation and production of a product such as a design material, and the use of such product in the creation of garments and trim therefor. In the prior art, there are countless methods of designing and manufacturing garments and trim, virtually all of which require individual design for fabric patterns as well as individual designs for the garments.

It is an object of this invention to provide a ready-made design pattern which can be then used in further processes for creating an infinite number of designs without the necessity of the designer creating original designs.

It is also an object of this invention to provide apparatus and equipment for making various sized trim pieces out of the design material for use on garments made out of the design material.

It is also an object of this invention to provide such apparatus and equipment and methods for use to create trim pieces out of the design material which may be used on a garment made of a plain material without design.

It is a further object of this invention to provide apparatus and equipment for creating trim pieces out of plain material which can be used on a garment made of plain material, and it is another object of this invention to provide apparatus, equipment and methods to implement the design of any garment by providing cut-out portions in said garment in accordance with the apparatus of the invention.

The invention is carried out as illustrated in the accompanying drawings in which:

FIG. 8 is a top plan view of a cutting board such as may be used in a press shown in FIG. 7;

FIG. 9 is a perspective view of the representation shown in FIG. 8;

FIG. 10 is a perspective view of a die;

FIG. 11 is a plan view of three pieces of material cut with the die of FIG. 10;

FIG. 12 is a plan view of a partially constructed garment in exploded arrangement;

FIG. 13 is a perspective view of a die;

FIG. 14 is a perspective view of a die;

FIG. 15 is a perspective view of a die;

FIG. 16 is a perspective view of a garment made in accordance with the invention;

FIG. 17 is a detail in side elevation;

FIG. 18 is a perspective view of the detail of FIG. 17 as seen from above with parts in dotted line to indicate the position of the die;

FIG. 19 is a perspective view of the material shown in FIG. 18 after it has been cut;

FIG. 20 is a perspective view of a die;

FIG. 21 is a perspective view of a die;

FIG. 22 is a perspective view of a die;

FIG. 23 is a perspective view of a die;

FIG. 24 is a perspective view of a die; and

FIG. 25 is a perspective view of a die.

Similar numerals refer to similar parts throughout the several views.

This invention is based on the construction of a design material such as the material shown in FIGS. 1 through 6 and FIGS. 8 and 9 of the drawings together with the methods for making and using such materials in order to construct various articles, especially garments with pleasing designs. These design materials are made up of main design panels, each of which contains a plurality of design units which may be defined from the designs in the main design panel as will be more fully explained hereinbelow.

Figure 1:
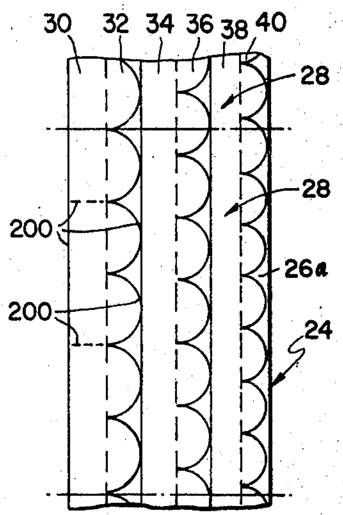
FIG. 1 is a plan view of a design material made in accordance with the invention.
Figure 2:
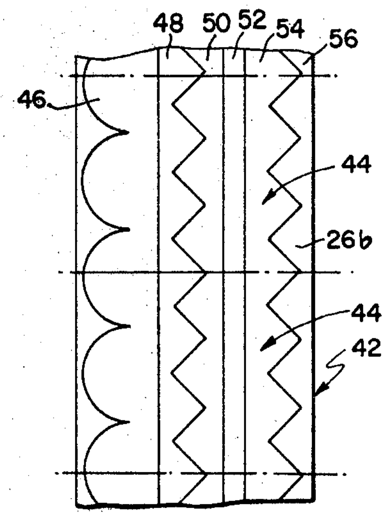
FIG. 2 is a plan view of another design material made in accordance with the invention.
Figure 3:
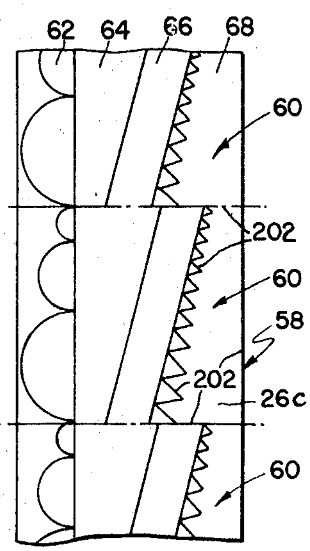
FIG. 3 is a plan view of another design material made in accordance with the invention.
Figure 4:
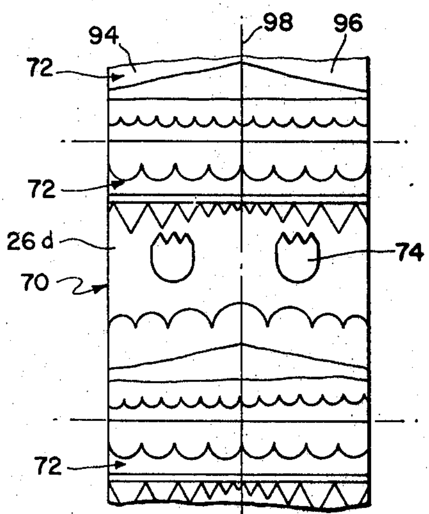
FIG. 4 is a plan view of another design material made in accordance with the invention.
Figure 5:
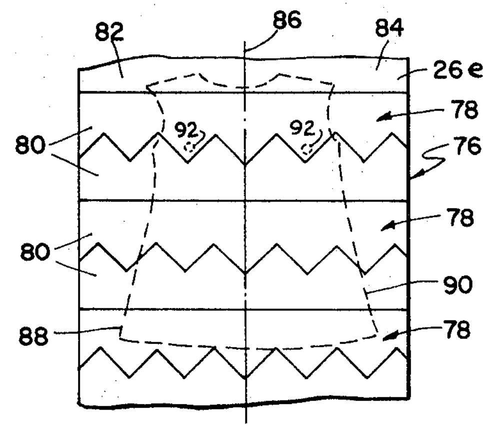
FIG. 5 is a plan view of another design material made in accordance with the invention having superimposed thereon a pattern part for a garment in dotted line.
Figure 6:
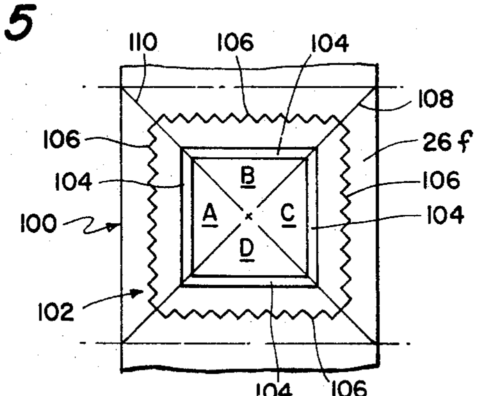
FIG. 6 is a plan view of another form of the invention.

In FIGS. 1 through 3, I show three design materials 24, 42 and 58, in the form of main design panels 28, 44 and 60 printed repetitively on fabrics in the piece *26a*, *26b* and *26c* respectively. In FIGS. 4 and 5, I show design materials 70 and 76 in which the design panels 72 and 78 could be considered either as single main designs or as two design panels meeting at central portions 98 and 86 respectively and being in mirror relationship to each other when the fabrics are folded along the center portion lines. In FIG. 6 I show a design material 100 printed on a fabric *26f* having a series of four design panels A, B, C and D. Here again, the design on design material 100 could be considerated as one four-part main design panel 102, or as four main design panels A, B, C and D which, when folded along fold lines 108 and 110 would have mirror-like parts identical to each other. In each of FIGS. 1 through 6, the main design panels are placed on the fabrics by means of the usual print roller (not shown) which is well known in the art. The main design is placed on the roller, and then printed repetitively on fabric in the piece in the usual manner. This is one way of printing the designs on the fabric. Another method may be by taking cut pieces of fabric and screen printing the designs on, or by using any other method of printing designs on either fabric in the piece or cut pieces to achieve separate pieces of fabric 26 as shown in FIGS. 8 and 9 containing designs to provide for design material such as 122 in FIGS. 8 and 9. In FIGS. 8 and 9, the design panels 122 on fabric 26 are shown stacked in a pile with the design being identical in each piece of fabric and in registration from the top to the bottom of the pile. Thus, any of the design panels shown in FIGS. 1 through 6 and in FIGS. 8 and 9 of the drawings may be placed on the fabric either by roller printing or by screen printing, or by any other method of printing, and each design material may contain one or more main design panels which in turn is comprised of design units which may be separated and used in accordance with the invention. Design units are illustrated at reference numerals 74 in FIG. 4 and 132 in FIG. 8, and will be more fully explained.

In FIG. 1 of the drawings, I show a design material 24 comprising rows of stripes 30, 34 and 38 and rows of scallops 32, 36 and 40. FIG. 1 shows these stripes and scallops starting wider and being reduced in size by a standard increment from left to right. For example, stripe row 30 may be 2 inches wide, scallop row 32 may be 1⅞ inches wide, stripe row 34 may be 1¾ inches wide, scallop row 36 may be 1⅝ inches wide, stripe row 38 may be 1½ inches wide, and scallop row 40 may be 1⅜ inches wide and so on for the width of a fabric. The fabric illustrated in FIG. 1 has three rows of stripes and scallops; however, any number of rows may be had in the fabric in accordance with its width. Fabric in the piece may be a standard 45 inches wide or any other width from 26 inches up to 80 inches, or any other width that can be used in accordance with the invention, and it is to be understood that any number of rows of stripes or scallops or stripes and scallops may be used, and that the number illustrated in the drawings of the invention are for illustration only and not to limit the size or configuration of the designs.

In addition to having stripes and scallops be decreased or increased by standard increments, they may also be of equal width in the design, and they may also be of irregular width and irregular shapes; a main requirement being that when the design of the invention is used by stacking pieces of design material in registration, each main design panel must be identical to the main design panel directly beneath it or above it in the stack.

In FIG. 2 of the drawings, I show a design material 42 as contained on fabric **26*b* having repetitive design panels of a main design 44 in which there is a line of scallops 46, a line of scallops 48, 50, 54 and 56, and a line of stripe 52. Scallop 46 is rounded and fairly wide in comparison to scallops 48 and 50 which have angular edges and are in reversed facing position. Scallops 54 and 56 are in reverse facing position with scallop 54 being slightly wider than scallop 56. Stripe 52 between scallops 50 and 54 appears to be narrower than the scallop rows and is uniform throughout the design. It is to be noted that panels 44** repeat, and will register substantially when cut along the border lines and placed one on top of each other as shown in FIGS. 8 or 9 of the drawings. (It is to be noted that the design in FIGS. 8 and 9 is somewhat different from that as shown in FIG. 2, but the same would hold true for any design made in accordance with the invention, when stacked they will register substantially above and below).

Thus, it is to be understood that there may be many rows of stripes or scallops or stripes and scallops either of uniform or graduated width with the number of stripes and scallops to be varied infinitely in accordance with the dictates of the designer.

The term "scallop" as used herein is defined to be one of a continuous series of, either circular or angular, projections or the like, forming a border, or if contained within a stripe, forming a scallop design within the stripe. A scallop may be in the form of a perfect semi-circle or an isosceles triangle, or in any curved or angular form, whether even or irregular, and will still be within the definition of a scallop in accordance with this invention. In addition, a row of scallops, whether curved or angular or a combination of both, may also be curved or angular and still be within the definition of scallops of the invention.

The edges of each scallop may also be scalloped with further scalloping in accordance with the invention. For example, reference is made to FIG. 22 of the drawings in which angular scallops have an angular border. In FIG. 23 of the drawings, irregularly sized circular scallops are further scalloped by having circular scallops. In FIG. 24 of the drawings, regular circular scallops are provided with both circular and angular scalloped borders, and in FIG. 25 of the drawings, regular circular scallops are provided with angular scalloped borders. It is, therefore, to be understood that the term "scallop" includes all of the mentioned and illustrated constructions, either as a single scallop or as a scalloped scallop, or as a series of scallops, or any other scallop construction which can be made in accordance with this definition.

Prior to my invention, scallops were made in the designing and fabric arts by marking the fabric by means well known in the art such as ink or powder, sewing the scallops in by machine, then having an operator hand cut around the scallops and turning them over to provide a finished appearance. This type of prior art operation was only good for making round scallops, and was not adaptable for making pointed scallops. It is a part of my invention to make both round and pointed scallops by means of a die cutting operation which provides a new method for making both round and pointed scallops.

Figure 7:
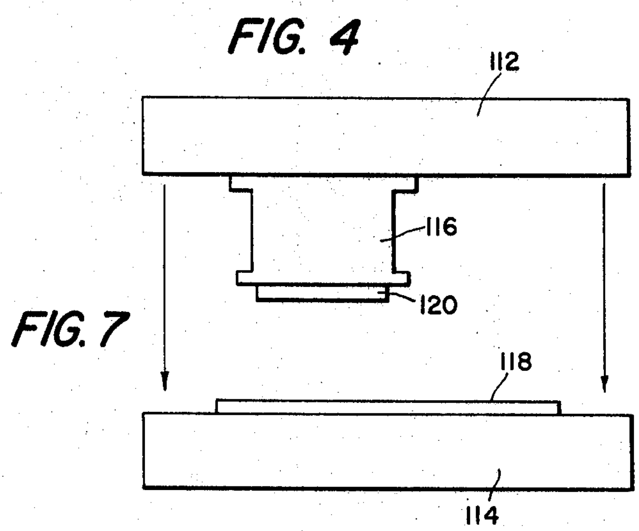
FIG. 7 is a diagrammatic view of a front elevation of a press.

It is an important part of this invention that I utilize a machine such as a die press adapted to cut fabrics stacked in layers by means of cutting dies. An example of such a die press would be one as set forth in the diagrammatic view of FIG. 7 having an upper beam 112, a lower beam 114, and a cutting head 116 adapted to travel to various positions with relation to a cutting block 118. Such a die press may not be described at length since it is well known to the art, and is exemplified by the die presses made by the Ormont Machine Company of New York, N.Y. Reference numeral 120 represents a die which may be used with the press.

In FIGS. 8 and 9 we have a view of the top of the cutting block of such a die press upon which has been placed several layers of superimposed pieces of design material made in accordance with the invention. A die 120 having a configuration to match at least a portion of the design panel 122 on the material 26 is placed on the head 116 and the press is adjusted so that a portion of the material 26 for each of the multi-layers on block 118 will be cut simultaneously.

Straight edges 124, 126, 128 and scalloped edge 130 of the die 120 will correspond to lines *124a, 126a, 128a* and *130a* shown in dotted line on FIG. 8 of the drawings. Thus, when a stroke of the press is properly made, a series of identical die cut pieces of material 134 will be cut at a single stroke from pieces 26. These pieces 134 now comprise design units of the invention, and are a plurality of such design units as may be contained within a main design panel such as panel 122 of the invention. Each design unit 134 is a complete unit containing an escalloped stripe or a stripe and a scallop. The actual size, shape and design feature of a design unit would depend on the portion of the main design selected to be cut by means of a die designed to have the proper contour for the design unit to be cut. In such case, the die such as die 120 would have to have outline contours or cutting contours which register with at least a portion of the main design of the design panel; in this case, the portions being registered with portions *126a* and *130a*. Lines *124a* and *128a* are cut into the design by the die and need not necessarily appear in the main design panel. Thus, the die 120 could have been made approximately 2½ times longer and then would have cut a design unit large enough to make the front of a belt portion such as design unit 136 as shown in FIG. 12. Design unit 136 may also be termed an accessory portion such as an accessory portion for a garment, being a part of the belt for a garment.

Thus far, I have described how a main design panel comprising stripes or scallops may be cut into design units in accordance with the invention, and have shown the use of one such design unit such as a belt 136 to be sewn onto a garment such as garment 138. It is to be understood that the main design can be varied infinitely so that design units of infiite variation can be provided for. I now refer to FIG. 3 of the drawings in which a piece of fabric 26*c* has been printed with a repetitive main design panel 60 to form a design material 58. Of course, design material 58 can be initially formed by printing a single design panel 60 on a single piece of fabric, or design panel 60 may be printed repetitively on a long piece of fabric and then cut to the proper panel size and then stacked for further use in accordance with the invention. Design panel 60 comprises scallops 62, stripes 64 and 66, and scalloped stripes 68. It is to be noted in this design of the invention that scallop row 62 contains three various sized rounded scallops, that stripe 64 is an irregular stripe, that stripe 66 is a regular slanted stripe, and that a scalloped stripe 68 is an irregular stripe having an irregular angular scollop.

In FIGS. 4 and 5, the design panels of the invention may be folded along central lines 98 and 96 to form mirror-like patterns. Thus, the design panel 72 of design material 70 on fabric 26*d* may be considered either as a single design panel or if it is desired to utilize it with the central line fold portion 98, then it may be folded over and cut accordingly, or it may be used as the design of FIG. 5 which I shall now describe. In FIG. 5 I similarly provide a design panel 78 in a design material 76 on fabric 26*e* in which there is again a central fold line 86. (It is to be understood that fold lines 86 and 98 need not be printed on the material.) I show in dotted line pattern parts for the front of a garment 88 and 90. These pattern parts may, of course, be cut separately and sewn together with a front seam along axis 86, or else they may be cut together as a unitary front for a garment such as that shown in FIG. 12 of the drawings. By providing a pattern such as FIGS. 4 and 5 containing mirror-like segments, I can then cut a single garment piece comprising various design units of the pattern symmetrically aligned on both sides of the common pieces. This can be readily understood by referring to FIG. 5. In this same manner, any pattern for a garment or other article and its pieces may be placed on the design material of the invention to provide for pattern pieces to be cut with symmetrical left hand and right hand designs, or symmetrical upper and lower designs, for non-symmetrical designs within any pattern piece, all of such designs comprising, if desired, the various design units of the designs of the invention in one or more forms, or in selected areas. Thus, various pattern pieces may be made in the shape of accessories for an article or garment, for example a pocket, and these accessory pieces can be designed as design units in the design of the material as, for example, design unit 74 in design panel 72 as shown in FIG. 4. Thus, design unit 74 is not only a design unit of the main design of the panel, but is also an accessory shape which may be used in a finished article. Thus, in FIG. 4 the design panel 72 is made up of various irregular stripes and scallops and units, all of which are placed in symmetry in both sides 94 and 96 of the axis 98; and in FIG. 5, opposed scallop stripes 80 are in mirror relationship in left and right segments 82 and 84 on both sides of fold line 86.

I also show in FIG. 5 placement marks 92 which may be used to place button ornaments or buttons or other types of ornaments at designated parts of the design. A main panel design 102 containing four separate main panel designs A, B, C and D is shown in FIG. 6. The separate main panel designs A, B, C and D are in mirror relationship at their adjoining parts with their neighbors along fold axis lines 108 and 110. Each portion of the design contains a stripe portion 104 and a scallop portion denoted by line 106. The quadrants A, B, C and D may contain any other type of design which will bear a mirror relationship at the axes lines. A design panel 102 such as shown in FIG. 6 may be used for a neck portion of a garment or any other portion where it is necessary to have a curved border or a border involving a corner or a design feature which can be repeated along one or more quadrants in angular relationship. The use of a panel such as complete design panel 102, either alone or in combination with one of the other design panels of the invention, will enable the designer to create untold numbers of design variations which can be duplicated in multiple by the use of the die cutting methods of the invention.

In FIG. 12 of the drawings, I show three pattern pieces for a garment such as a dress. Cut pattern piece 138 is substantially similar to the dotted line pattern piece comprising reference numerals 88 and 90 as shown in FIG. 5 and would represent the front of a garment such as a dress. There is also cutout pattern for a sleeve 140, and the third piece 152 represents the cutout or fallout from the use of die 150 around a neck portion 154 of the front panel 138. Cutout pattern piece or sleeve 140 may be further ornamented by the use of a die such as die 142 containing an escalloped stripe by escalloping edge 144 of the sleeve. This may be done to a single piece 140 or to a multiple number of pieces 140 stacked together with one stroke of die 142. It is to be noted that die 142 may be in the form of a scallop of a design unit of a design of any of the design materials of the invention, or it may be any one of a number of design dies made for the invention for ornamenting article or garment pieces. Die 150 as illustrated in FIG. 14 of the drawings may be one of any number of dies made in accordance with the apparatus of the invention, and in this case, having a curved shape adapted to be used to ornament the neckline 154 of a dress. In this case, die 150 has a regular curve with a row of angular scallops along the curve. When the cut of die 150 is made on piece 138 at the proper neck place, an escalloped portion 154 will result and there will be at least one fallout piece 152. If more than one piece 138 is cut at the same time, for example if a number of pieces 138 are stacked and die cut in multiple, then there will be many fallout pieces 152. These fallout pieces may be used for further ornamenting the design of the dress or article by placing them as shown at reference numerals 156 on the garment and sewing or fastening them by any other means. Garment pieces 138 and 140 may be cut from either plain fabric or from design material made in accordance with the invention. Pieces 138 and 140 may be cut from pattern in multiple in any manner already known to the art, or they may be actually die cut in the first instance by a proper die in the shape of the pattern pieces.

In FIG. 15 I show a die 160 made with contour outlines adapted to correspond to design unit accessory piece 74 as shown in FIG. 4 of the drawings. Such design unit pieces 74 may be cut out and used to provide pockets such as pockets 162 and 164 as shown in FIG. 12. In pocket 162 the scalloped edge of the design is turned down and sewn, and in pocket 164 the scalloped edge is allowed to remain up. Thus, the same accessory or trim piece may be used to provide two different variations as shown in 162 and 164. In addition, dies such as dies 150 and 160 may be used not only to cut design units from actual design materials, but may also be used to cut units from plain pieces of fabric to be used as trim on either plain materials or design unit materials. Various dies should be made in accordance with the invention in various pocket shapes, in various belt shapes, and in various collar shapes, and in various shapes for other pieces of trim. These dies can be used to cut shapes of material in the form of accessories and trim for either garments or other articles to be made in accordance with the invention. The dies may also be used to cut out portions of designs or portions of plain materials before or after shaped into garments or articles. For example, in FIG. 16 a sleeveless garment is made in accordance with the invention. It is provided with a yoke 168 which has cutout portions 170 and 172. The yoke 168 may be made of a plain piece of material such as material 174 as illustrated in FIGS. 17, 18 and 19 of the drawings. A die 176 having scalloped portions is used to cut along a fold line 178 of the material 174, making triangular cuts 182 with the teeth 180. When the material is opened up, the triangular cuts will be doubled into the squared cutout portions 170 as shown in the yoke 168. A die such as die 186 shown in FIG. 20 may also be prepared to provide for cutout portions with the contours 172.

Garment 166 is made out of a fabric **126*g* which will contain design panels and design units in accordance with the invention. Some design units may be completely cut out as shown at reference numerals 190. This may be done by design unit die 192 as shown in FIG. 21. In other words, there may be a scalloped portion of the design which it is desired to cut out completely from a finished garment. This is done by using die 192 in the shape of the design unit desired to be cut out, resulting in the four cutouts 190 as shown in the front of the garment 166**.

It is, therefore, to be understood that the essence of the invention is to provide means and apparatus for producing a new type of material called a design material, all of which may be used to create designs for various articles and in particular articles of clothing such as garments. The design material has main design panel or panels having design features adapted to be cut into design units by a plurality of dies made with contours having at least a portion thereof corresponding to portions of the main designs. There are also dies for accessory units and various dies with various contours to be used to cut materials from plain or design materials for use with design materials or plain materials. It is thus a most important feature of this invention to provide a die cutting system for the variety of dies for use in cutting designs from multiple pieces of material. This method can be standardized to some extent by providing a number of standardized designs together with various dies for making a plurality of design units from these standardized designs on main design panels. A large and almost unlimited variety of designs together with accessory pieces and design units can thus be created from a few standardized designs.

The dies of the invention, whether created for use as cutters of design units from a design of the invention, or as cutters of accessories, may be used nevertheless to cut similar sized units from any type of fabric. It will be seen that the dies used with the invention have various curved portions which are adapted to cut in registration along the lines of the main design. Thus, the lines or curves of either the dies or the design portions of the invention may be either straight, angular, bent or curved, and it is understood that the term "line" or "curve" when used with the die as well as with the design is a design feature, whether straight, bent, angular or curved. Thus, a main design panel of the invention such as those illustrated herein will be made up of a plurality of lines which may be either straight, bent, angular or curved, and the contours of the dies of the invention will correspond accordingly, and in order to simplify the language of the claims hereinbelow, the term "line" or "curve" is meant to include all of these variations.

In addition, it is to be understood that the dies of the invention will usually be in the form of a closed cutting curve; however, where a die is used to cut along an edge or border, such as die 176, it may be comprised of an open curve which would include the angled teeth 180. The resulting cut will provide the cutout portions 170, or in a case where such a die was used against an edge of an unfolded piece of material, the resulting cut, which could be a design unit, would have a border comprising the portion cut by the die and the edge which is not cut by the die. Thus, the border of any piece cut from any material of the invention could be a closed curve border, and certainly any design unit of the invention would normally have a border in the form of a closed curve immediately after being cut.

The foregoing explanation is made in order to clarify the terminology as used in this application, and is not deemed to limit the scope of the construction of the design units or other features of the invention.

Examples of the numerous pluralities of dies that could be made in accordance with the invention are indicated by referring to the design materials of the drawings. In FIGS. 1 through 6, the designs are provided with various lines. Any number of dies could be made up having closed curve contours including one or more of the lines of the design. Specific examples of such closed curved contours are shown at reference numerals 74 and 132. Further examples are included by using the boundaries comprised by reference numerals 200 as shown in FIG. 1 and by using reference numerals 202 as shown in FIG. 3. The contour shown by reference numerals 200 in FIG. 1 provides three straight line edges and one edge comprising two semi-circles, and the closed curve of the contour provided at reference numerals 202 in FIG. 3 shows three straight edge lines and a fourth slanted angular, or scalloped line with the sizes of the scallops increasing regularly from top to bottom. In addition to these few examples given, an unlimited variety of dies for use in the system of the invention can be provided by selecting any closed curve formed with at least one line, or a portion of a line of a design of the design material as a part of such closed curve; and additional dies can be made having open curves with a portion of such curve corresponding to a line or portion of a line of the design material.

While I have described my invention in its preferred forms, there are other forms which it may take without departing from the spirit and scope of the invention, and I, therefore, desire to be protected for all forms coming within the claims hereinbelow.

Wherefore I claim:

1. A design material comprising a main blank including at least one main design panel comprising a plurality of lines, in which at least a portion of said lines is continguous with at least a portion of the border of at least one design unit included within said main design, said design unit positioned on said main blank to be cut out of said main blank with only one line of cutting between the main blank and said design unit.

2. A design material as defined in claim 1 in which the design unit is a trim piece.

3. The design material as defined in claim 2 in which the trim piece is adapted to be applied to the main design pattern after cutting.

4. The design material as defined in claim 1 in which the main design comprises a row of stripes.

5. The design material as defined in claim 1, in which the main design comprises a row of scallops.

6. The design material as defined in claim 1, in which the main design comprises rows of stripes and scallops.

7. The design material as defined in claim 6, in which each succeeding row of stripes and scallops is a standard increment wider than the preceding rows.

8. The design material as defined in claim 1, in which there are a plurality of main design panels made up in separate adjoining segments, and in which there are at least two adjoining segments including design units in mirror relationship to each other at the point of juncture.

9. A method for creating designs for articles which comprises the steps of providing design material having at least one main design panel comprising a plurality of lines in which at least a portion of said lines is continguous with at least a portion of at least one design unit included on said main design panel and then cutting pieces of material along only one cutting line between at least one design unit and the balance of said main design panel to produce at least one separate design unit of material.

10. A method for creating garment designs for articles as defined in claim 9 which comprises the further steps of placing the main design on a plurality of lengths of fabric and then stacking said lengths into at least one stack with the main design in each length substantially in registration throughout the stack, then die cutting identical pieces of fabric forming at least one design unit from the lengths of fabric in the stack along cutting lines in registration with at least a portion of said main design, to produce at least one design unit in multiple copy.

11. A method for creating article designs as defined in claim 9 which comprises the further steps of cutting design units from a second fabric, either plain or having a design different from said main design of the first mentioned fabric, said design cuts from said second fabric adapted to be in registration with a corresponding design unit portion of the main design of the first mentioned fabric; and then placing said design units cut from said second mentioned fabric on the first mentioned fabric, or portions thereof, during the steps of manufacturing an article from said first mentioned fabric.

12. A method for creating article designs which comprises the steps of claim 9, and comprises the further steps of providing design unit dies for cutting fabric having cutting contours adapted to be in registration with a design unit portion of the main design of the said fabric, and then using the said dies to cut pieces from another fabric, either plain or having a design different from said main design, and then placing the pieces so cut from the second fabric on the first mentioned fabric, or portions thereof, during the steps of manufacturing an article from said first mentioned fabric.

13. The method for making garment designs which comprises the steps as set forth in claim 9, and comprises the further steps of providing dies having contour cutting portions in the shape of accessory pieces for the garment and then cutting at least one accessory portion from the fabric.

14. A method for creating article designs which comprises the steps of claim 9 and comprises the further steps of providing design unit dies for cutting fabric having cutting contours adapted to be in registration with a design unit portion of the main design of the said fabric, and then using said dies to cut pieces from another fabric, either plain or having a design different from said main design, while said second fabric is folded and making said cut with a fold line of the fabric within the contours of the die, and then selecting portions of said fabric, when unfolded, and containing cutout portions, and then placing said fabric portions together with portions from said first mentioned fabric during the steps of manufacturing an article from said first mentioned fabric.

References Cited

UNITED STATES PATENTS

| | | | |
|---|---|---|---|
| 1,335,627 | 3/1920 | Waterfield. | |
| 1,701,152 | 2/1929 | Freedman | 2—244 X |
| 1,898,950 | 2/1933 | Goldberger. | |
| 3,216,024 | 11/1965 | Menhart | 2—243 X |

FOREIGN PATENTS

| | | |
|---|---|---|
| 619,039 | 9/1935 | Germany. |
| 527,695 | 6/1955 | Italy. |

ALFRED R. GUEST, Primary Examiner